United States Patent [19]

Ohtaki et al.

[11] Patent Number: 4,625,416
[45] Date of Patent: Dec. 2, 1986

[54] CLEARANCE MEASURING APPARATUS FOR AN ASSEMBLY DEVICE

[75] Inventors: Keizaburo Ohtaki, Hatoyama; Ryo Niikawa; Masashi Sakata, both of Sayama, all of Japan

[73] Assignee: Honda Giken Kogyo Kabushiki Kaisha, Tokyo, Japan

[21] Appl. No.: 734,729

[22] Filed: May 16, 1985

[30] Foreign Application Priority Data

May 16, 1984 [JP] Japan .................................. 59-70405

[51] Int. Cl.⁴ .......................... G01B 7/02; B23P 21/00
[52] U.S. Cl. .............................. 33/180 AT; 33/147 K; 29/709
[58] Field of Search ............. 33/147 K, 180 AT, 503, 33/533, 548, 555, 557, 558, 572; 29/709, 721

[56] References Cited

U.S. PATENT DOCUMENTS

| 3,067,520 | 12/1962 | Geraghty, Jr. .................. 33/147 K |
| 3,531,868 | 10/1970 | Stevenson ............................ 33/503 |
| 4,208,796 | 6/1980 | Michaud et al. ................. 33/147 K |
| 4,447,959 | 5/1984 | Watanabe et al. ............... 33/147 K |
| 4,477,978 | 10/1984 | Azuma ........................... 33/180 AT |
| 4,479,305 | 10/1984 | Wendl et al. .................. 33/180 AT |
| 4,554,742 | 11/1985 | Freitag ............................. 33/147 K |

FOREIGN PATENT DOCUMENTS 1164853 10/1958 France ................. 33/147 K

Primary Examiner—Richard R. Stearns
Attorney, Agent, or Firm—Armstrong, Nikaido, Marmelstein & Kubovcik

[57] ABSTRACT

Clearance measuring apparatus for measuring the amount of clearance formed between circumferential edges of a component part and a component part assembling portion of a product main body used with a set jig holding the component part. A stationary claw is fixed to the set jig and is arranged to be arranged to be brought into engagement with the edge of the part. A movable claw is mounted to be movable in a clearance measuring direction and is arranged to be brought into engagement with the edge of the assembling portion. A detecting device is provided for detecting the amount of displacement of the movable claw in relation to the stationary claw.

4 Claims, 7 Drawing Figures

CLEARANCE MEASURING APPARATUS FOR AN ASSEMBLY DEVICE

BACKGROUND OF THE INVENTION

This invention relates to a clearance measuring apparatus used chiefly with an automatic assembling apparatus for a part of a motor vehicle, for example, a vehicle door with a vehicle body. More particularly the invention is directed to a clearance measuring apparatus in combination with a set jig for holding a component part such as a door or the like which is to be assembled with a product main body such as a vehicle body or the like. The clearance measuring apparatus measures the amount of a clearance formed between circumferential edges of a component part assembling portion of the product main body and the component part.

As for an apparatus of this kind, a known one is disclosed in Japanese Unexamined Patent Application Publication SHO-54-5276, for instance. A set jig for holding a door is provided with a wedge-shaped locating member which is inserted into a clearance formed between circumferential edges of a door opening portion of a vehicle body and the door. The door assembling operation with the vehicle body is carried out with the set jig set in a position such that the amount of the clearance may become a predetermined amount by inserting the locating member into the clearance as far as a predetermined depth position.

This has the disadvantage that, if a stepped or shoulder portion formed on the circumferential edge of the door opening portion is shallow in depth, for instance, the locating member cannot be inserted as far as a required constant depth position, so that the clearance becomes unequal. Additionally, the vehicle body can be damaged or injured by the locating member.

It can be considered in this case that the wedge angle of the locating member is made comparatively large so that insertion depth of the locating member may be set to be comparatively short. However, in such an arrangement, certain disadvantages result such as the guiding function of the locating is decreased at the time of insertion thereof. A wrench is likely to occur between the same and the vehicle body. Additionally, the changing rate of the clearance amount in relation to the insertion depth is increased and thus, accurate or precise management of the clearance becomes difficult.

OBJECT AND SUMMARY OF THE INVENTION

This invention has for its object to provide an apparatus in which, for removing the foregoing disadvantages, instead of the conventional system wherein the clearance amount is measured by the insertion depth of the wedge-shaped member into the clearance, a movable claw which is movable in the clearance measuring direction is used so that the clearance amount may be measured accurately or precisely even in a case where the insertion depth into the clearance is restricted.

The invention is characterized in that there is provided a stationary claw which is fixed to a set jig and is arranged to be brought into engagement with a circumferential edge of a component part, and a movable claw which is movable in the clearance measuring direction and is arranged to be brought into engagement with a circumferential edge of a component part assembling portion of a product main body so that, by detecting a displacement amount of the movable claw in relation to the stationary claw by means of a detecting means, the amount of a clearance formed between the circumferential edges of the component part assembling portion and the component part may be measured.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
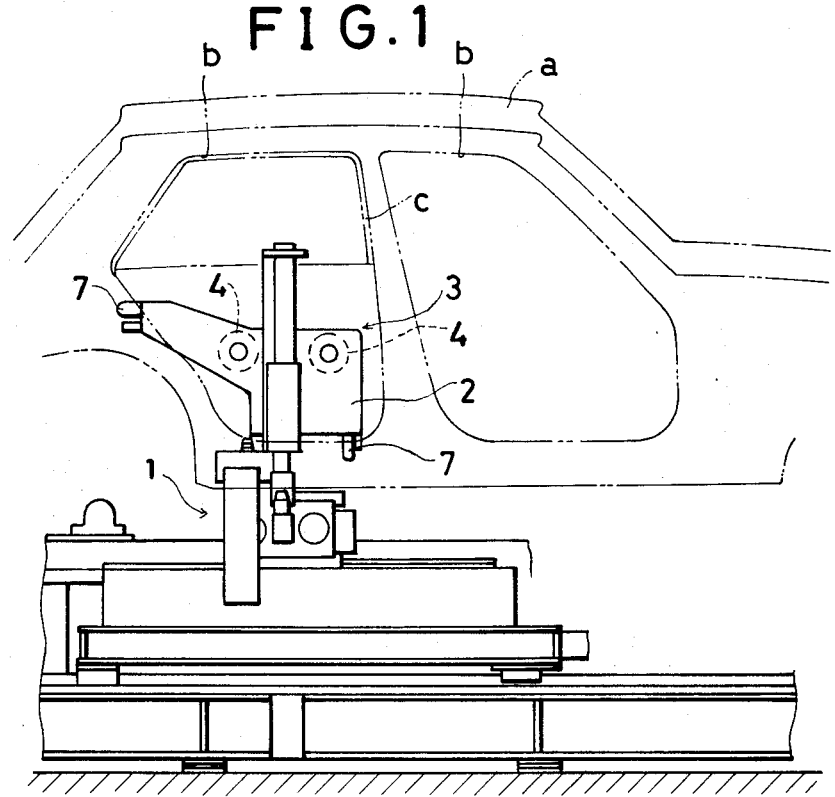
FIG. 1 is a front view of one example of a vehicle door assembling apparatus provided with this invention.
Figure 2:
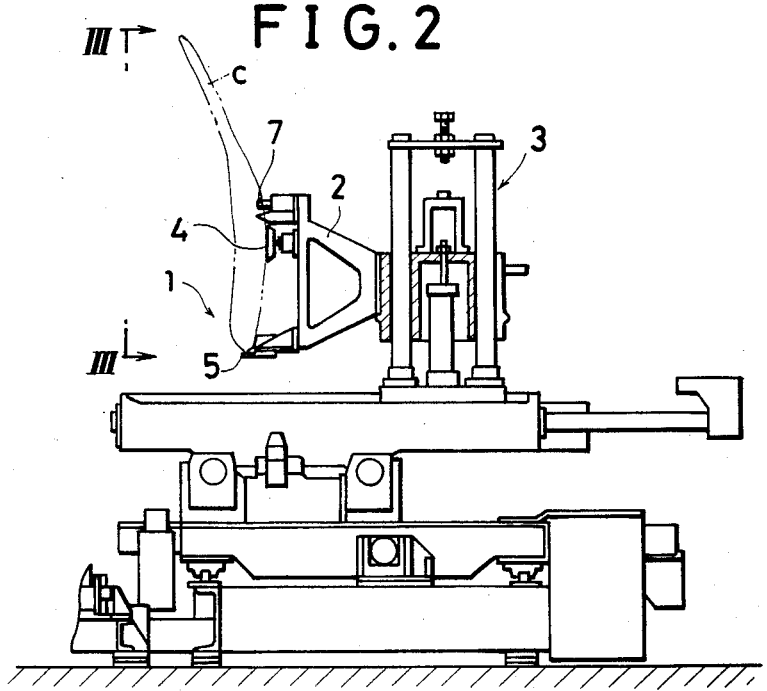
FIG. 2 is a side view thereof.

One embodying example of this invention will be explained with reference to the accompanying drawings:

FIGS. 1 and 2 show a vehicle door assembling apparatus provided with this invention.

Referring to the figures, a door assembling station 1 is provided in the middle of a conveying line for a vehicle body a. A set jig 2 is provided on a side portion of the station 1 so that a door c constituting a component part may be assembled, using the set jig 2, with a door opening portion b constituting a component part assembling portion which is a side surface of the vehicle body a constituting a product main body set in the station 1.

Figure 3:
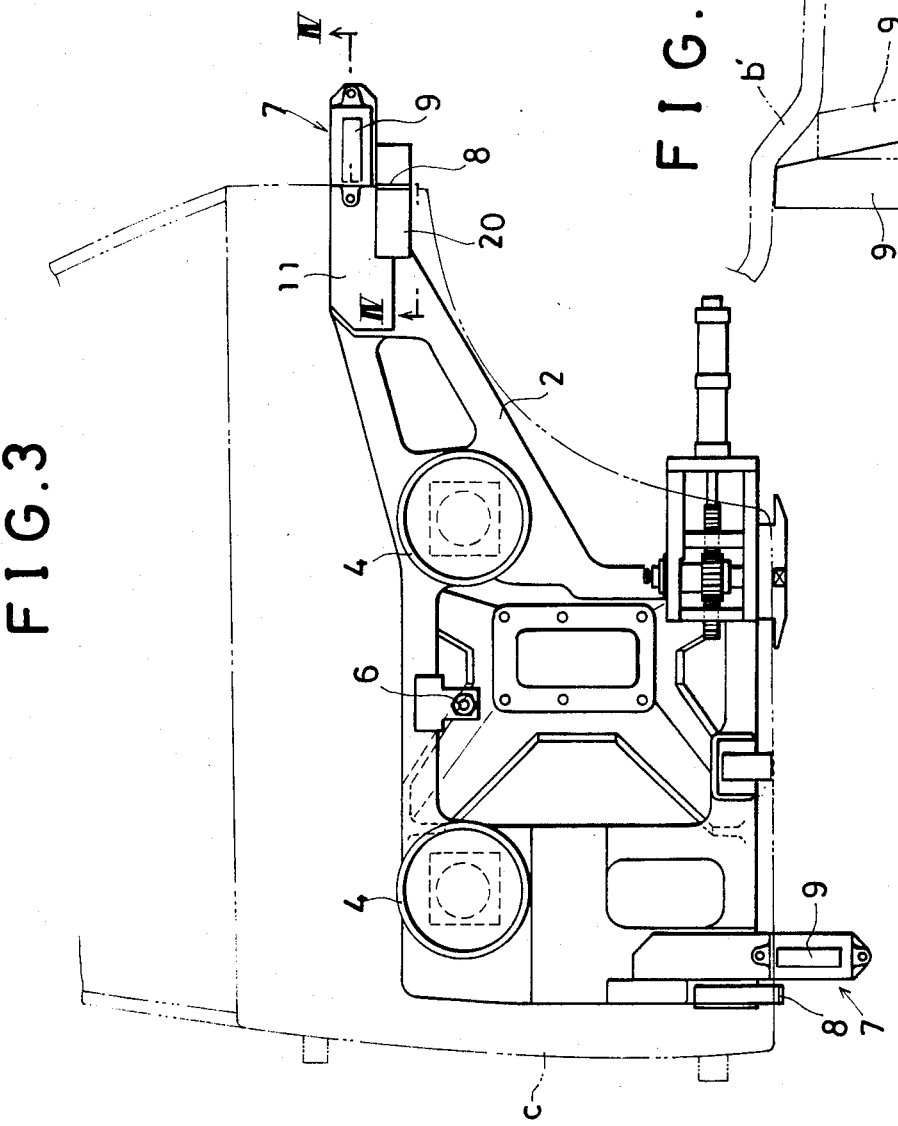
FIG. 3 is a front view of a set jig thereof viewed from the lines III—III in FIG. 2.

The set jig 2 is supported by a three dimensional right-angled coordinates type robot mechanism 3 and is movable in three directions, that is, in the vehicle length direction, in the vehicle width direction and in the vehicle height direction by a control means (not shown). Additionally, as shown clearly in FIGS. 2 and 3, the set jig 2 is provided with a pair of vacuum pads 4,4 for attracting and holding the door c, a door receiving member 5 for receiving a lower edge of the door c, a proximity switch 6 for detecting the door c set in position, and a clearance measuring apparatus 7 in accordance with the present invention for measuring an amount of a clearance formed between the circumferential edges of the door c and the door opening portion b.

In the illustrated example, a pair of the clearance measuring devices 7 are provided. One of the two is used for measuring the clearance amount in the vehicle length direction between rear edges of the door c and the door opening portion b, and the other is used for measuring the clearance amount in the vehicle height direction between lower edges of the door c and the door opening portion b.

Figure 6:
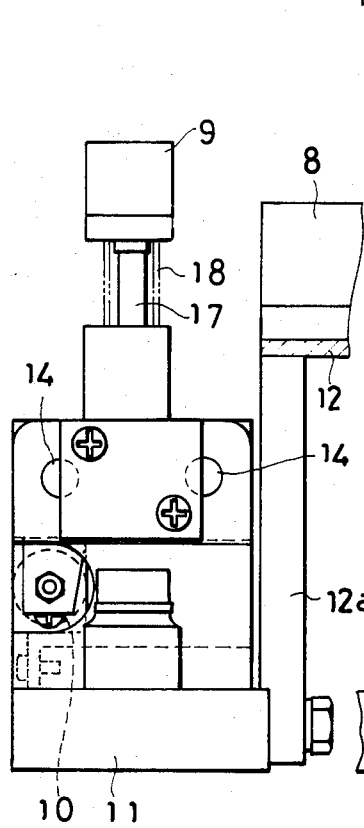
FIGS. 5 and 6 are sectional views taken along the lines V—V and VI—VI in FIG. 4.
Figure 4:
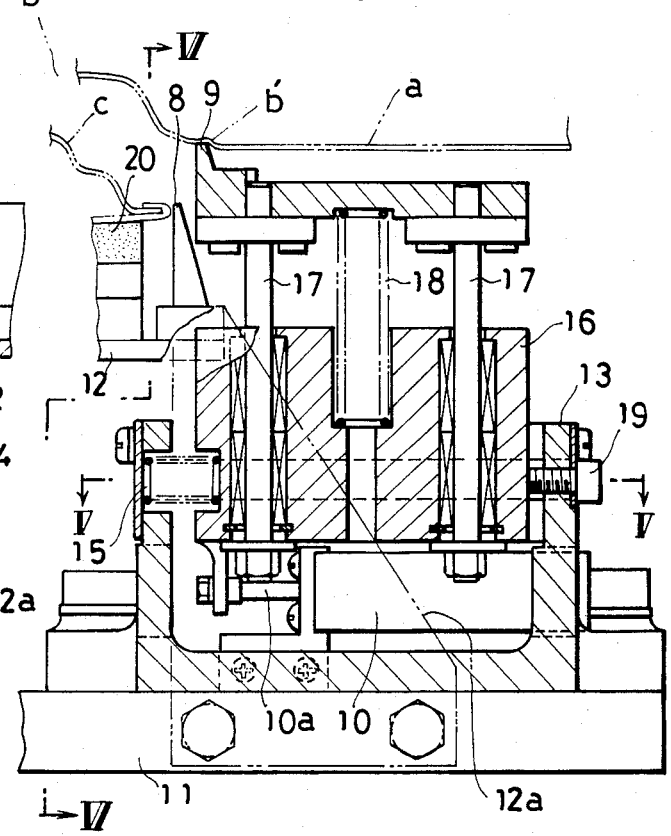
FIG. 4 is a sectional view taken along the line IV—IV in FIG. 3.
Figure 5:
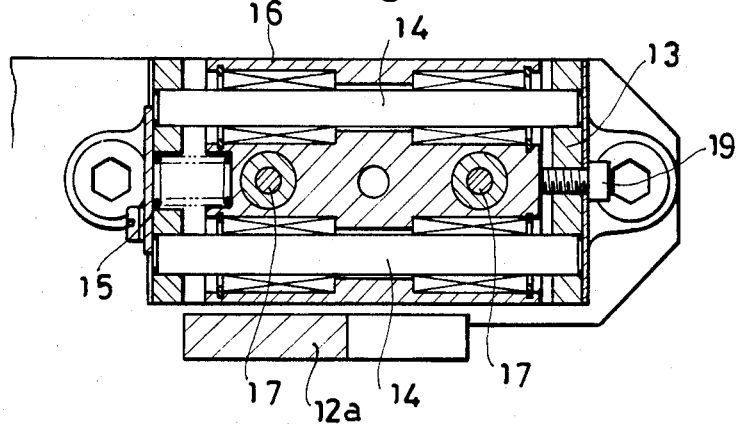

As shown clearly in FIGS. 4–6, each device 7 comprises a stationary claw 8 which is fixed to the set jig 2 and is arranged to be brought into engagement with the circumferential edge of the door c, a movable claw 9 which is movable in the clearance measuring direction and is arranged to be brought into engagement with the circumferential edge of the door opening portion b, and a detecting means 10 for detecting a displacement amount of the movable claw 9 in relation to the stationary claw 8.

More in detail, the stationary claw 8 is fixedly provided on a supporting base 12 attached through a leg member 12a to a bracket 11 fixed to the set jig 2. A slidable frame 16 is movable in the clearance measuring direction along a pair of guide bars 14,14 and is urged by a spring 15 in a direction away from the stationary claw 8. The frame 16 is provided in a casing 13 fixedly provided on the bracket 11. The movable claw 9 is integrally formed on a plate which is movably supported through a pair of rods 17,17 on the slidable frame 16, and is urged by a spring 18 towards the vehicle body a. The detecting means 10 which is a potentiometer having a slider 10a arranged to be moved with the slidable frame 16 is provided in the casing 13.

Referring to the drawings, a screw stopper 19 for the slidable frame 16 is provided on the casing 13 and a pad 20 is provided on the supporting base 12 for preventing the door c from rattling.

Figure 7:
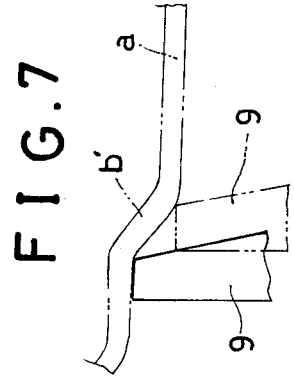
FIG. 7 is a view showing an operation of this invention.

Next, the operation of this example is explained as follows:

When it is intended to assemble the door c with the main body a, the door c is set in position on the set jig 2 by means of the door receiving member 5 and each stationary claw 8 of the two clearance measuring devices 7, and is attracted and held by the vacuum pads 4,4. Then, the set jig 2 is once set in position at a position corresponding to the door opening portion b, and thereafter is advanced inwards in the vehicle width direction towards the door opening portion b. The movable claw 9 of each clearance measuring device 7 is brought into engagement with a predetermined circumferential stepped engaging edge portion b' of the door opening portion b after making a relative lateral movement in relation to the stationary claw 8 as shown in FIG. 7, so that the clearance amount in the vehicle length direction and that in the vehicle height direction between the door c and the door opening portion b can be measured, respectively, from respective signals outputted from the detecting means 10 of the respective devices 7, each detecting displacement amount of its movable claw 9 in relation to its stationary claw 8. Thereafter, in accordance with the deviations of the measured clearance amounts from a predetermined amount thereof, the set jig 2 is given a fine adjustment by the robot mechanism 3 through a control means (not shown) in the vehicle length direction and in the vehicle height direction, respectively, to result in the final set position. By the subsequent advancing movement of the set jig 2, the door c can be assembled correctly with the door opening portion b.

Thus, according to this invention, the set jig for assembling the component part with the product main body is provided with a stationary claw which is fixed thereto and is arranged to be brought into engagement with the circumferential edge of the component part, and a movable claw which is movable in the clearance measuring direction and is arranged to be brought into engagement with the circumferential edge of the component part assembling portion of the product main body. Using the detecting means for detecting the displacement amount of the movable claw in relation to the stationary claw, the clearance amount between the circumferential edges of the component part and the component part assembling portion may be measured. Accordingly, it is advantageous in that, if the circumferential edge of the component part assembling portion has a stepped or shoulder portion which is to be brought into engagement with the movable claw, the clearance amount can be measured accurately and a precise or proper assembling can be carried out. Thus the foregoing disadvantages in the conventional apparatus wherein the clearance amount is measured by the depth of the insertion of a wedge-shaped member are eliminated.

It is readily apparent that the above-described clearance measuring apparatus meets all of the objects mentioned above and also has the advantage of wide commercial utility. It should be understood that the specific form of the invention hereinabove described is intended to be representative only, as certain modification within the scope of these teachings will be apparent to those skilled in the art.

Accordingly, reference should be made to the following claims in determining the full scope of the invention.

What is claimed is:

1. A clearance measuring apparatus to be used on a set jig for holding a component part which is to be assembled with a product main body, said apparatus being for measuring the amount of a clearance formed between circumferential edges of a component part assembling portion of the product main body and the component part, the apparatus comprising a stationary claw fixed to the set jig and arranged to be brought into engagement with the circumferential edge of the component part, a casing attached to the set jig, a pair of guide bars mounted in the casing aligned along the clearance measuring direction, a slidable frame movably mounted on the guide bars, a first spring urging the frame in the clearance measuring direction away from the stationary claw, a pair of rods slidably mounted on the slidable frame, a plate mounted on said rods, a second spring urging said plate in a direction towards the product main body, a movable claw mounted on said plate being thereby movable in the clearance measuring direction for engagement with the circumferential edge of the component part assembling portion, and detecting means for detecting a displacement amount of the movable claw in relation to the stationary claw.

2. A clearance measuring apparatus as claimed in claim 1, wherein the detecting means is a potentiometer having a slider arranged to be moved with the movable claw.

3. A clearance measuring apparatus as claimed in claim 1, further comprising a bracket fixed to the set jig, a leg member mounted on the bracket, and a support base carrying said stationary claw attached to the leg member.

4. A clearance measuring apparatus as claimed in claim 1, wherein the detecting means is a potentiometer mounted on the casing and having a slider connected to the slidable frame.

* * * * *